Aug. 27, 1968     H. L. GRISHAM     3,398,948
WAVE GENERATING DEVICE
Filed Jan. 27, 1966
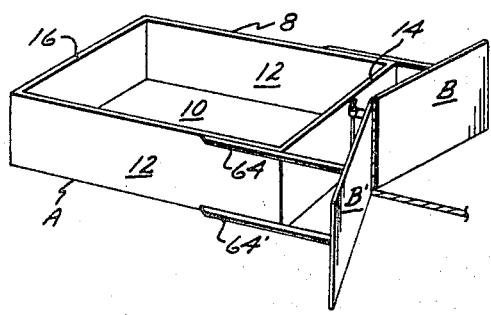
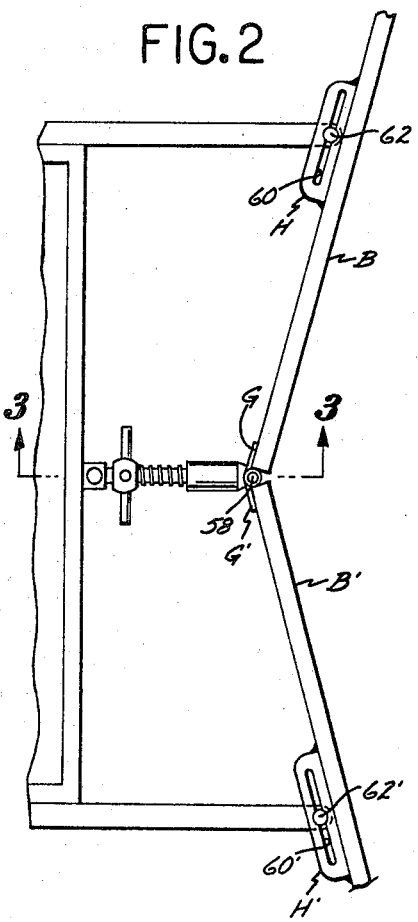
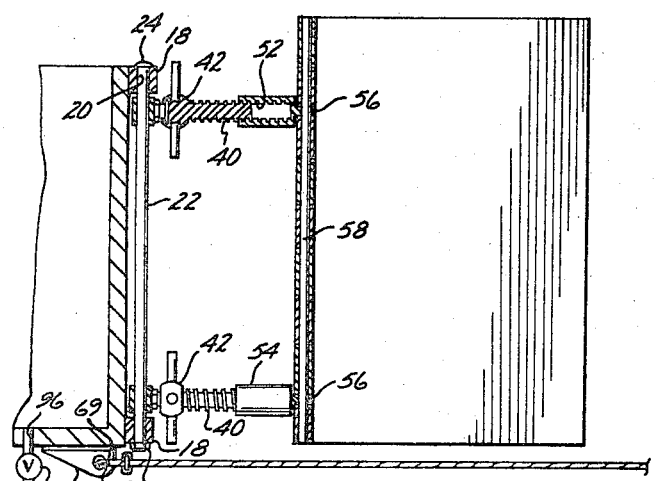
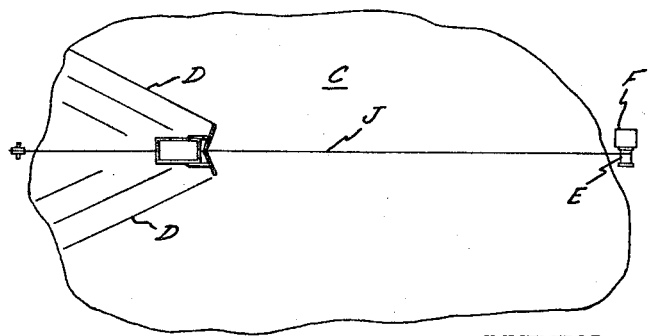
INVENTOR.
HAROLD L. GRISHAM
BY
William C. Babcock
ATTORNEY

United States Patent Office 3,398,948
Patented Aug. 27, 1968

3,398,948
WAVE GENERATING DEVICE
Harold L. Grisham, Long Beach, Calif.
(6530 E. 11th, Anchorage, Alaska 99504)
Filed Jan. 27, 1966, Ser. No. 523,388
8 Claims. (Cl. 272—1)

The present invention relates generally to the field of sports equipment, and more particularly to a mechanically actuated device for producing waves on a body of normally still water for sports activities.

During the past few years aquatic sports that require a wave action have become increasingly popular. In many small bodies of inland water, such as artificial lakes, the water is normally quiet and has little or no wave action. Generation of artificial waves in predetermined directions on such a body of water has prior to the present invention not been possible.

A major object of the present invention is to provide an apparatus that has a relatively simple mechanical structure, is simple and easy to operate, and one that can be installed on a normally quiet body of water to produce artificial waves of a desired height and in a desired direction, at a relatively low cost.

Another object of the invention is to supply a wave generating device that will increase the popularity of an inland body of water such as an artificial lake, or the like, as a center of sports activity, and in particular to those sports in which a wave action is required.

Yet another object of the invention is to furnish a wave generating device that requires little or no maintenance and one that can be operated by a person having ordinary mechanical skills.

These and other objects and advantages of the present invention will become apparent from the following description of a preferred form thereof, and from the accompanying drawing illustrating the same, in which:

FIGURE 1 is a perspective view of a mechanically operated wave generating device;

FIGURE 2 is a fragmentary top plan view of the forward portion of the device shown in FIGURE 1;

FIGURE 3 is a vertical cross-sectional view of the forward portion of the device, taken on line 3—3 of FIGURE 2;

FIGURE 4 is an enlarged cross-sectional view of a portion of the device;

FIGURE 5 is a top plan view of the device as installed on a body of normally quiet water; and FIGURE 6 is a side elevational view of the device as installed on the body of water.

Referring now to the drawing for the general arrangement of the device, it will be seen that it includes a buoyant body A that is preferably a rigid box 8 open at the top. The box 8 is preferably of rectangular shape, and is defined by a bottom 10, two side walls 12 that extend upwardly therefrom, a forward end wall 14 and a rearward end wall 16.

The device, as can best be seen in FIGURES 1, 2, 5 and 6, includes two identical rigid, rectangular blades B and B', that are transversely disposed forwardly of the end wall 14, and hingedly connected to the adjoining ends thereof. When the body A and the blades B supported therefrom are drawn forwardly across a body of normally still water C, as shown in FIGURES 5 and 6, a sequence of angularly disposed waves D are generated. The waves D are used for various aquatic sports activities.

Movement of the body A and blades B and B' to the right to generate waves, as viewed in FIGURE 5, is by an endless cable J, that frictionally engages a drum E that is a part of a power-driven winch F. The winch F is of a type that is commercially available, and may be driven either by an electric motor, internal combustion engine, or the like.

Forwardly disposed end wall 14 has two heavy lugs 18 that project therefrom. The lugs 18 are vertically spaced from one another. Lugs 18 have vertically aligned bores 20 formed therein that are engaged by a rod 22 that has a head 24 and a lower threaded end that is engaged by a nut 26. The rod 22 has two vertically spaced tubular members 28 mounted thereon, with each member having a transversely disposed tapped bore 30 formed therein. Each of the tapped bores 30 is engaged by a heavy bolt-like member 32 that has a circular flange 34 on a forward end thereof. Threads 36 of each bolt-like member 32 are also engaged by a lock nut 38 to hold the bolt-like member 32 in a non-rotatable position relative to the tubular member 28.

Two elongate threaded members 40 are provided that have heads 42 on the rearward ends thereof. The detailed structure of one of the heads 42 is shown in FIGURE 4. Each of the heads 42 has a number of circumferentially spaced handles 44 projecting therefrom. Each head 42 has a circular recess 46 formed in the rearward portion thereof that rotatably engages one of the flanges 34. The flanges 34 are removably held within the recesses 46 by snap rings 48, or the like. Each snap ring 48 removably engages a circumferentially extending slot 50 formed in one of the heads 42.

The forward portions of the threaded members 40 engage threads 52 formed on the interior of two relatively heavy cylindrical bodies 54. The forward portions of the bodies 54 have rings 56 extending forwardly therefrom, through which a heavy vertically disposed rod 58 extends, and the rod being rigidly secured to the rings 56 by conventional means, such as welding or the like. The blades B and B' are formed from a heavy rigid sheet material, such as steel or the like. Blades B and B' have a series of piano-like hinges G and G' on the adjacently disposed edges thereof that pivotally engage the rod 58.

Blades B and B' each have pairs of vertically spaced plates H and H' secured to the rearward outer portions thereof, and the plates having longitudinally extending slots 60 and 60' therein. The pairs of slots 60 and 60' are slidably engaged by pins 62 and 62'. The pair of pins 62 and second pair of pins 62' are rigidly secured to the forward ends of heavy horizontally disposed rigid members 64 and 64' that are secured to the side walls 12 and 12', respectively, as may best be seen in FIGURES 1 and 2. Plates H and H' rest on the upper forward surfaces of members 64 and 64'. By concurrently rotating the two heads 42, as shown in FIGURE 3, the threaded members 40 are also rotated, and cause the cylindrical bodies 54 to move forward or rearward relative thereto depending upon the direction in which threaded members 40 are rotated. As the threaded members 40 are rotated in a direction to move into the cylindrical bodies 54, the cylindrical bodies 54 and the adjacent portions of the blades B and B' move rearwardly to decrease the included angle between the blades. When the handles 44 are rotated in an opposite direction, the blades B and B' are moved forwardly to increase the included angle therebetween. As the blades B and B' are moved forwardly or rearwardly, as above described, the pins 62 and 62' slide in the slot 60, 60' to permit angular adjustment of the blades.

Two longitudinally spaced lugs 66 extend downwardly from the bottom 10. The lugs 66 have openings 67 therein through which loops 69 formed on the ends of the cable J extend. The cable J has several turns thereof that engage the drum E. The left-hand end of the cable J, as can best be seen in FIGURE 6, engages a first pulley 70 that is rotatably supported on an elongate member 72 that has the lower end thereof embedded or otherwise secured to a heavy body or dead man 74, that is buried in an embankment 76 adjacent to the body C. A second pulley 78 engages the lower right-hand portion of the cable J, as can be seen in FIGURE 6, and is rotatably supported on the upper end of a rigid member 80 that is likewise secured to a dead man 82 that is embedded in an embankment 84. Two pulleys 86 and 88 are rotatably supported on an elongate member 90, that is connected to a dead man 92, that is also embedded in the embankment 84. The pulleys 70, 78, 86 and 88 serve to maintain the upper reach 94 of cable J in a substantially horizontal position, to permit the body A and blades B to be moved to the left, as viewed in FIGURE 6, and then by operating the drum E at a desired rate of rotation, draw the body A and blades B to the right, as viewed in FIGURE 6, to generate waves D. The rapidity with which the body A and blades B and B' are moved to the right, as viewed in FIGURES 5 and 6, will determine the height of the waves, with the generation of the wave and the height thereof also being controlled by the angularation of the blades B and B' relative to one another, and the depth to which the blades B and B' are immersed in the body of water C. The buoyancy of the body A is easily controlled by adding a ballast thereto, which may be sand, gravel, or more conveniently water that is discharged thereinto. The amount of ballast (not shown) in the body A will determine the depth that it and the blades B, B' are immersed in the water defining the body C. The blades B and B' are angularly adjustable to one another as previously mentioned by concurrently rotating the threaded members 40 by use of the handles 44 to move the portion of the blades B, B' having the hinges G and G' thereon forwardly or rearwardly relative to the rod 22.

Should it be desired, the bottom 10 may have an opening 96 formed therein that is in communication with a valve 98 that is normally closed, but may be opened to allow water to flow into the confines of the box 8 to serve as ballast therein. The valve 98 can be used for draining the liquid ballast from the box 8, when the box is raised to an elevated position above the body C, such as being partially pulled upwardly onto the embankment 76 or 84.

The use and operation of the invention has previously been described in detail, and need not be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. A device for use in generating waves in a body of water that includes:
   (a) a buoyant body;
   (b) two transversely disposed blades;
   (c) first means for pivotally connecting adjacently disposed ends of said blades;
   (d) second means mounted on said buoyant body for supporting and guiding the outer end portions of said blades;
   (e) third means for adjustably supporting said first means forwardly of said body with said blades adjusted to a desired angle relative to one another;
   (f) a cable connected to said buoyant body; and
   (g) fourth means for concurrently drawing said cable, body and blades forwardly across at least a portion of said body of water for said blades to create waves in said body of water as they travel therethrough.

2. A device as defined in claim 1 in which said body is a box open at the top, and said device further including:
   (h) means for allowing a desired amount of water to enter said box from said body of water to act as ballast and control the depth to which lower portions of said box and blades are submerged therein.

3. A device as defined in claim 1 in which said first means are:
   (h) a vertically disposed rod; and
   (i) a plurality of piano-like hinges that project rearwardly from said blades and pivotally engage said rod.

4. A device as defined in claim 1 in which said second means are:
   (h) two pairs of laterally spaced rigid members that project forwardly from said buoyant body;
   (i) a plurality of spaced plates that project rearwardly from said blades and rest on the forward end portions of said rigid members; and
   (j) a plurality of pins mounted on the forward end portions of said rigid members that movably engage a plurality of elongate slots defined in said plates.

5. A device as defined in claim 3 in which said third means are:
   (j) a plurality of cylindrical bodies that have threads on the interior thereof;
   (k) fifth means for rigidly supporting said cylindrical bodies rearwardly of said rod;
   (l) a plurality of elongate threaded members that project forwardly from said buoyant body and engage said threads in said cylindrical bodies;
   (m) sixth means for rotatably supporting rear end portions of said elongate members in fixed positions relative said buoyant body; and
   (n) seventh means for manually rotating said elongate threaded members.

6. A device as defined in claim 3 in which said cable is disposed to define an endless belt that is at least partially submerged in said body of water, and said device further including:
   (j) further means for affixing the free ends of said cable to said buoyant body.

7. A device as defined in claim 6 in which said fourth means is a power-driven reel that frictionally engages said cable.

8. A device as defined in claim 7 that further includes:
   (k) a plurality of spaced rotatably supported pulleys that movably engage said cable and maintain the same in a desired configuration.

References Cited

UNITED STATES PATENTS

| | | | |
|---|---|---|---|
| 586,983 | 7/1897 | Wharton | 4—178 XR |
| 2,164,651 | 7/1939 | Haskin | 272—26 |
| 3,125,339 | 3/1964 | Nielsen | 272—32 |
| 3,185,474 | 5/1965 | Saiko | 272—32 |

RICHARD C. PINKHAM, *Primary Examiner.*

P. SHAPIRO, *Assistant Examiner.*